United States Patent [19]
Stone

[11] Patent Number: 5,929,530
[45] Date of Patent: Jul. 27, 1999

[54] ADVANCED SOLAR CONTROLLER

[75] Inventor: Kenneth W. Stone, Huntington Beach, Calif.

[73] Assignee: McDonnell Douglas Corporation, St. Louis, Mo.

[21] Appl. No.: 08/938,907

[22] Filed: Sep. 26, 1997

Related U.S. Application Data

[63] Continuation of application No. 08/516,351, Aug. 18, 1995, abandoned.

[51] Int. Cl.$^6$ ..................................................... H02P 9/04
[52] U.S. Cl. ............................... 290/2; 290/1 R; 60/39.02
[58] Field of Search .................................... 126/573, 574; 290/54, 43, 52, 1 R, 2; 60/39.02, 398; 417/217, 315

[56] References Cited

U.S. PATENT DOCUMENTS

| | | | |
|---|---|---|---|
| 3,837,432 | 9/1974 | McKendrick | 184/7.4 |
| 3,892,433 | 7/1975 | Blake | 290/52 |
| 4,090,070 | 5/1978 | Colomes . | |
| 4,095,118 | 6/1978 | Rathbun | 290/2 |
| 4,187,834 | 2/1980 | Hoinski . | |
| 4,272,783 | 6/1981 | Warnstam et al. . | |
| 4,300,533 | 11/1981 | Sacco . | |
| 4,314,546 | 2/1982 | Miller . | |
| 4,328,789 | 5/1982 | Nelson | 126/579 |
| 4,361,758 | 11/1982 | Rotolo . | |
| 4,370,559 | 1/1983 | Langley, Jr. | 290/1 R |
| 4,424,802 | 1/1984 | Winders | 126/576 |
| 4,481,768 | 11/1984 | Goshorn et al. | 60/327 |
| 4,510,385 | 4/1985 | Welman | 250/203.4 |
| 4,536,847 | 8/1985 | Erickson et al. . | |
| 4,556,788 | 12/1985 | Hanak | 250/203.4 |
| 4,646,718 | 3/1987 | Wood | 126/601 |
| 4,691,075 | 9/1987 | Murphy | 136/246 |
| 4,767,292 | 8/1988 | Kinder | 418/2 |
| 4,942,736 | 7/1990 | Bronicki | 60/641.12 |
| 5,047,654 | 9/1991 | Newman | 290/52 |
| 5,417,052 | 5/1995 | Bharathan et al. | 60/39.02 |
| 5,444,972 | 8/1995 | Moore | 60/39.182 |

*Primary Examiner*—Nestor Ramirez
*Assistant Examiner*—Nicholas Ponomarenko
*Attorney, Agent, or Firm*—Alston & Bird LLP

[57] ABSTRACT

A solar tracker which has a pneumatic motor that moves a reflective surface. The pneumatic motor is power by pressurized air stored in a pedestal of the tracker. The pressurized air is replenished by a compressor that draws in air from the atmosphere. The pneumatic motor and compressor are controlled by a microcontroller. The controller, compressor and pneumatic motor are all powered by an energy system that converts solar energy into electric power, thereby providing a self-contained tracker. The output shaft of the pneumatic motor is coupled to a reflective surface support structure by a drive system which has intermediate gears and an incremental encoder. The incremental encoder provides a reference point for the position of the reflective surface. The gear is much smaller than the gimbal so that the reference point can be found with a relatively small incremental movement of the reflective surface.

12 Claims, 5 Drawing Sheets

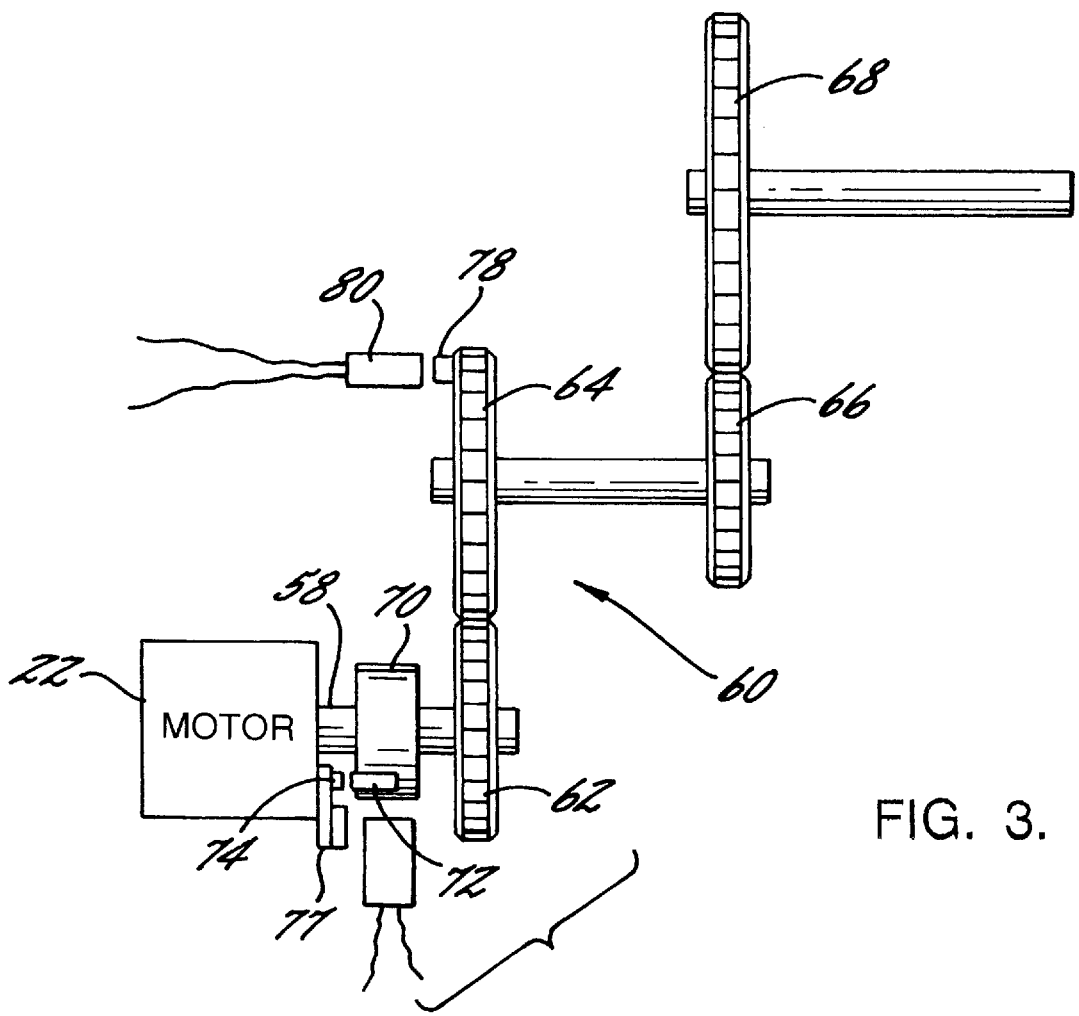
FIG. 3.
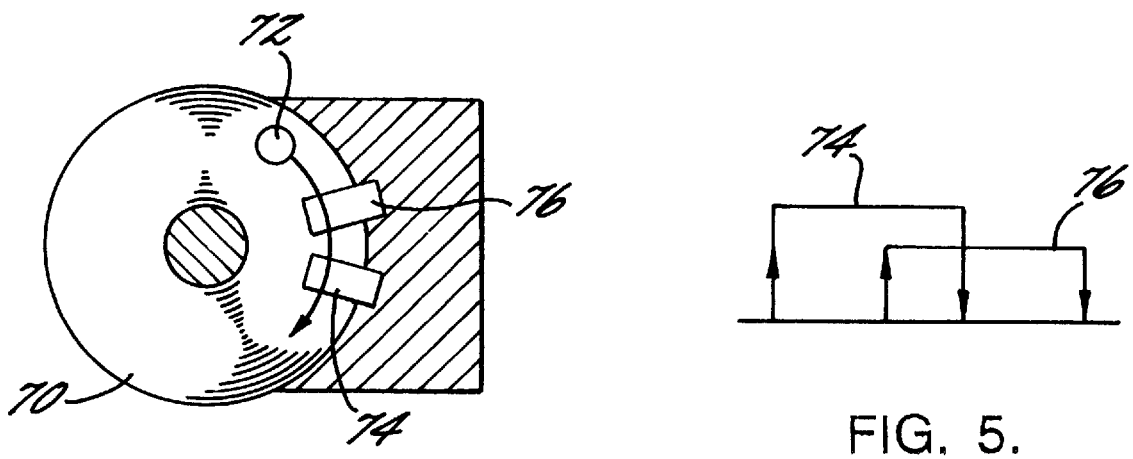
FIG. 4.
FIG. 5.

ADVANCED SOLAR CONTROLLER

This application is a continuation of application Ser. No. 08/516,351, filed Aug. 18, 1995, now abandoned.

BACKGROUND OF THE INVENTION

1. Field of the Invention

The present invention relates to a solar tracker used to direct solar energy.

2. Description of Related Art

Electrical power systems that operate on fossil fuels create environmentally harmful by-products. For this reason there has been developed alternate fuel systems to generate electricity. U.S. Pat. No. 4,536,847 issued to Erickson et al., discloses a concentrator solar conversion system that converts solar energy into electric power. The concentrator system has a plurality of trackers that each have reflective surfaces which reflect solar energy to a single focal point. Located at the focal point is a receiver unit which converts the solar energy into electrical power.

The reflective surfaces are rotated to track the movement of the sun so that the reflected solar energy is always focused on the receiver. The reflective surfaces are moved by motors that are controlled by a computer. The trackers are typically connected to the computer and a power supply by field wires.

The receiver typically has a heat exchanger which becomes heated by the reflected solar energy. The heat is transferred to a working fluid that drives a device such as a turbine or sterling engine. The turbine converts the thermal energy into mechanical energy, which is then converted into electrical energy by a generator. The working fluid also functions as a coolant that reduces the temperature of the receiver. If the flow of working fluid is terminated, the solar energy will quickly overheat and melt the receiver. In such a situation, it is desirable to move the trackers to a standby position so that solar energy is not directed toward the receiver. For example, lightning may strike and damage the power distribution system. Without power, the tracker is unable to move to the standby position. It would therefore be desirable to provide a self-sufficient tracker that can independently move the position of the reflective surfaces.

The reflective surfaces are typically rotated about a gimbal. The gimbal has an incremental encoder that provides feedback signals which are used to determine the relative position of the reflective surfaces. When power is terminated to the tracker, the reflective surfaces must be moved back to an initial reference position to reinitialize the system. Because of the relatively low slew rate of the tracker motor, this process can take up to 20–40 minutes. It would be desirable to reduce the time required to obtain a reference position of the trackers. It would also be desirable to improve the accuracy of a solar tracker to optimize the energy conversion efficiency of a solar energy system.

SUMMARY OF THE INVENTION

The present invention is a solar tracker which has a pneumatic motor that moves a reflective surface. The pneumatic motor is powered by pressurized air stored in a pedestal of the tracker. The pressurized air is replenished by a compressor that draws in air from the atmosphere. The pneumatic motor and compressor are controlled by a microcontroller. The controller, compressor and pneumatic motor are all powered by an energy system that converts solar energy into electric power, thereby providing a self-contained tracker. The output shaft of the pneumatic motor is coupled to a reflective surface support structure by a drive system which has intermediate gears and an incremental encoder. The incremental encoder provides a reference point for the position of the reflective surface. The gear is much smaller than the gimbal so that the reference point can be found with a relatively small incremental movement of the reflective surface.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3 is a side view of a gear train and encoder system;

FIG. 4 is a top view of a motor incremental encoder system;

FIG. 5 is a schematic showing the feedback signals of the encoder;

DETAILED DESCRIPTION OF THE INVENTION

Figure 1:
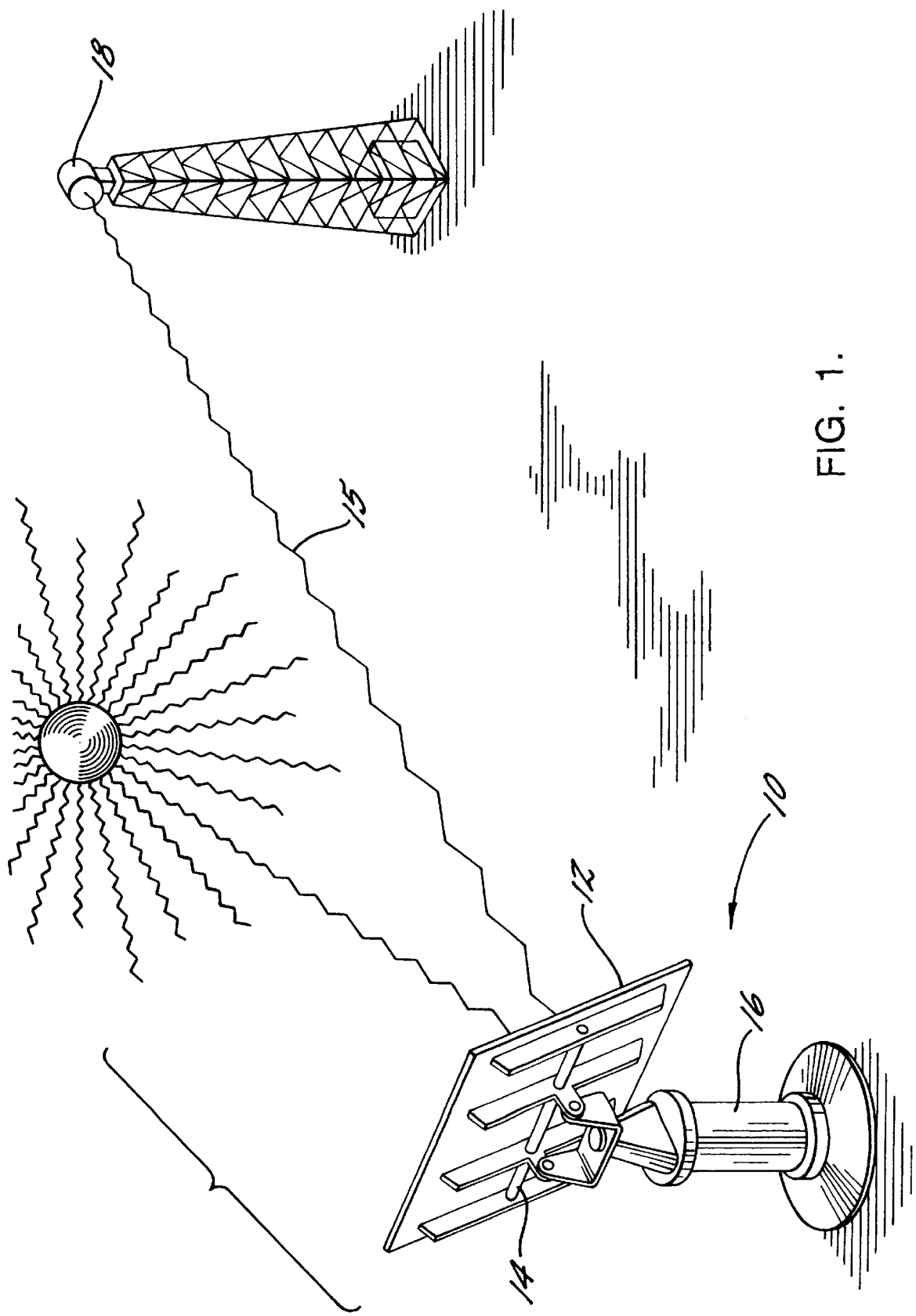
FIG. 1 is a perspective view of a tracker of the present invention.

Referring to the drawings more particularly by reference numbers, FIG. 1 shows a tracker 10 of the present invention. The tracker 10 has a plurality of reflective surfaces 12 attached to a mirror frame 14 that is supported by a pedestal 16. The reflective surfaces 12 may reflect solar energy to a receiver unit 18 that converts the solar energy to electrical power. The receiver unit 18 may have a central computer (not shown) that transmits information to the tracker 10 so that the mirrors track the movement of the sun.

Figure 2:
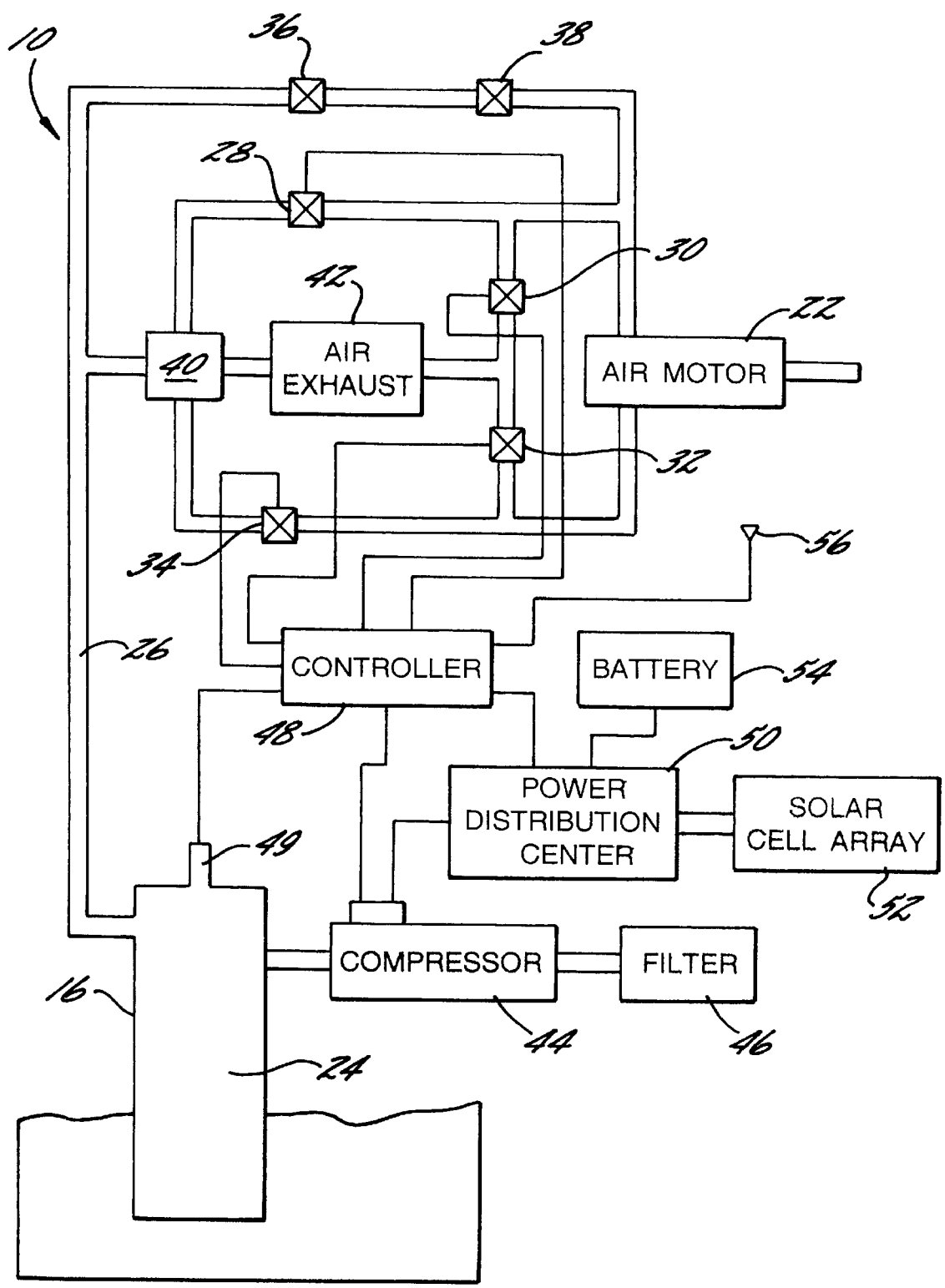
FIG. 2 is a schematic of the control components of the tracker.

As shown in FIG. 2, the tracker 10 contains a pneumatic motor 22 that moves the reflective surfaces 12 to track the sun. The motor 22 is connected to a reservoir 24 of pressurized air by air lines 26. The structure of the reservoir 24 is preferably the pedestal 16 of the tracker 10. The flow of air from the reservoir 24 to the motor 22 is controlled by valves 28–34. Valves 28 and 32 are opened to move the motor 22 and reflective surfaces 12 in one direction. Valves 30 and 34 are opened to move the mirrors 12 in an opposite direction. In a system that requires external electrical power to control the tracker 10, the motor 22 may be connected to the pressurized air by a safety valve 36 that is normally open. The safety valve 36 is maintained in a closed state by the presence of electrical power. In the event electrical power is discontinued, the valve 36 becomes open and the motor 22 is driven so that the mirrors 12 move to a stowed position. The system may have a mechanical stop valve 38 that terminates the flow of air to the motor 22 when the mirrors 12 reach the fully stowed position. To improve the life of the motor 22, oil is added to the air by an oiler 40. The oil is removed by a filter 42 and returned to the oiler 40 before the air is discharged to the atmosphere.

The air reservoir 24 is pressurized by a compressor 44. A filter 46 is connected to the compressor 44 to remove any impurities within the air drawn in from the atmosphere. The compressor 44 and valves 28–34 are controlled by a microcontroller 48. The controller 48 is connected to a pressure sensor 49 within the reservoir 24. The controller 48 starts the compressor 44 when the pressure within the reservoir 24 falls below a lower threshold value, and stops the compressor 44 when the reservoir pressure exceeds an upper threshold value.

The tracker 10 is powered by a solar cell array 52 that converts solar energy into electrical power. The solar cell array 52 is connected to a power distribution unit 50 which distributes power to the various components within the system. Excess power can be stored within a back-up battery 54 which provides power to the system when sunlight is not available. The controller 48 can be connected to an antenna 56 that receives commands from a remote controller unit.

In operation, the controller 48 receives commands through the antenna 56 to change the operating mode of the tracker 10. The controller 48 calculates the required position based upon the operating mode and turns on the motor 22 until the position is reached. The controller energizes a pair of valves 28/32 or 30/34 to allow air to enter the motor 22 and rotate the mirrors 12. If the air pressure within the reservoir 24 decreases below the lower threshold value the controller 48 energizes the compressor 44. The valves are energized until the motor 22 has reached the desired position. The process of receiving commands and moving the mirrors 12 is continuously repeated so that the heliostat tracks the movement of the sun.

As shown in FIGS. 3 and 4, the output shaft 58 of the motor 22 is coupled to the mirrors 12 by a gear train 60. The gear train 60 includes an output gear 62 coupled to a first intermediate gear 64. The first intermediate gear 64 is connected to a second intermediate gear 66 that is coupled to a gimbal gear 68 that is attached to the reflective surfaces.

Attached to the output shaft 58 of the motor 22 is a collar 70. The collar 70 has a magnetic element 72. The encoder element 72 can be detected by a pair of sensors 74 and 76 that are connected to the controller 48. The sensors 74 and 76 provide feedback signals when the magnetic encoder element 72 is adjacent to the sensors. The sensors 74 and 76 are attached to a mounting plate 77 located between the motor 22 and the collar 70. The encoder can be assembled without having to compensate for any spatial deviation between the collar 70 and the sensors along the longitudinal axis of the output shaft 58.

As shown in FIG. 5, each sensor 74 and 76 generates a feedback signal when the encoder element is adjacent to the sensor. A counter within the controller 48 increments one value when both sensor feedback signals are active. Each counter increment corresponds to a full revolution of the motor output shaft 58. The direction of rotation can be determined by detecting which sensor first provides a feed back signal. If the sensor 74 provides the first feedback signal the motor 22 is rotating in a first direction, if the sensor 76 provides the initial signal the motor 22 is rotating in the opposite direction. The tracker 10 has a known ratio between the rotation of the collar 70 and the movement of the mirrors 12. In this manner the controller 48 can determine the position of the reflective surfaces 12.

Referring to FIG. 3, the first intermediate gear 64 also has an encoder element 78 that is coupled to a sensor 80. The encoder element 78 and sensor 80 provide an intermediate reference point signal to the controller 48. There is a fixed number of collar 70 turns for each full revolution of the intermediate gear 64. The controller 48 counts the number of collar 70 turns between the occurrence of intermediate gear reference signals. If the counted number deviates from a known value the controller 48 adjust the count for any error. In the event that electrical power is terminated and the system must be re-initialized, the controller 48 can rotate the motor 22 until the reference point signal from the sensor 80 is sensed to find a new reference point for the counter of the system. The encoder elements 72 and 78 may be magnets. The sensors 74, 76 and 80 may be Hall-Effect sensors.

Figure 6:
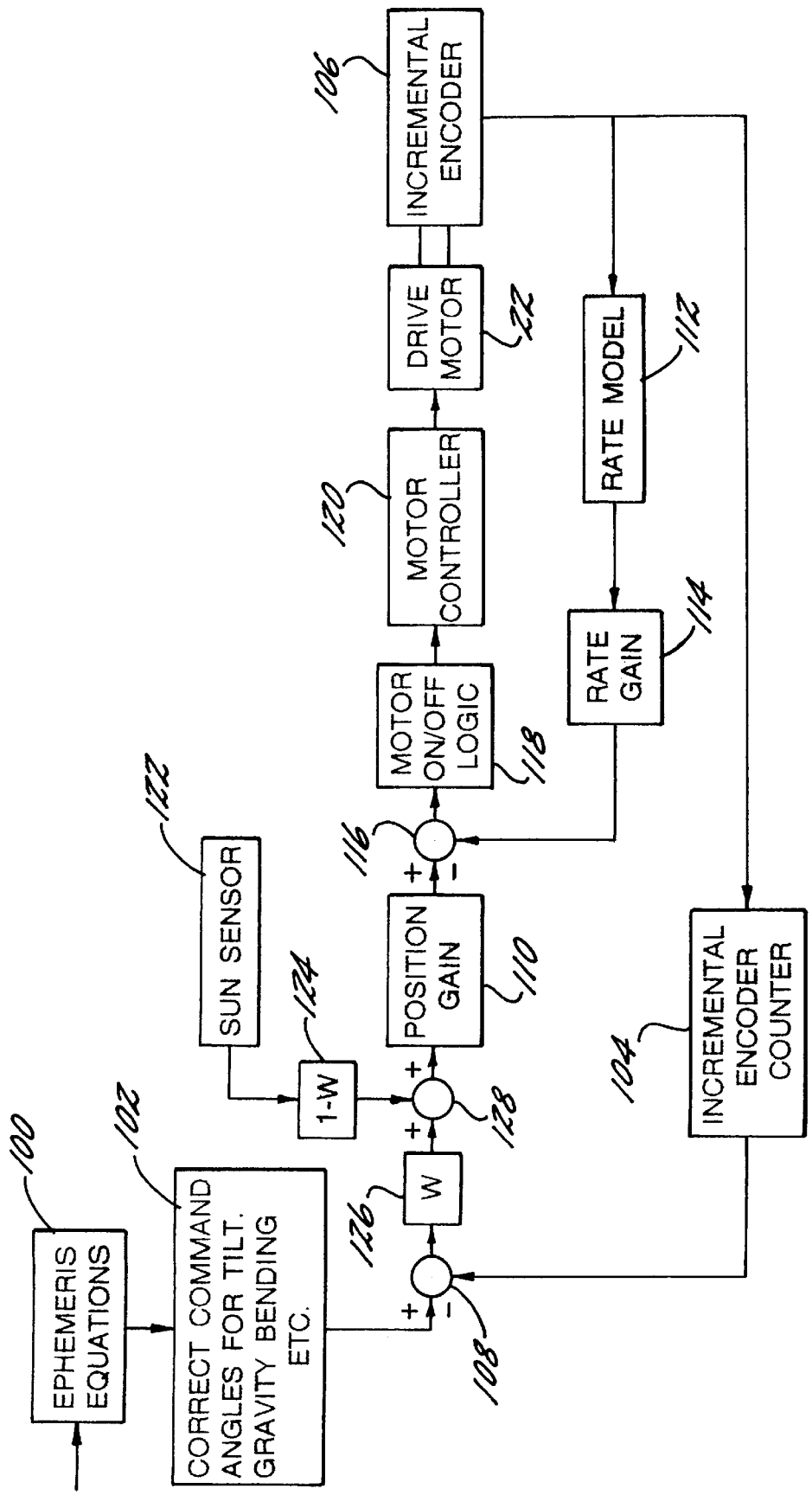
FIG. 6 is a logic diagram showing the control logic of the heliostat.

The tracker 10 moves the mirrors in accordance with a logic control system shown in FIG. 6. Gimbal angle commands are computed from time, date, and heliostat latitude and longitude input values in logic block 100, using ephemeris equations. The commands are adjusted for variations of the specific heliostat in logic block 102. The actual gimbal angles are provided by an increment encoder counter 104 that counts the turns of the increment encoder 106 coupled to the output shaft 58 of the motor 22. The actual angles are subtracted from the command angles by adder 108 to provide a gimbal error angle. The error signal is multiplied by a gain in logic block 110.

Logic block 112 computes the motor rate from the turns provided by the increment encoder 106. The rate is multiplied by a gain in logic block 114. The motor rate is added to the error signal by adder 116. Logic block 118 determines whether the motor should be turned on based on the output of adder 116. The logic block 118 provides an input to a motor controller 120 which drives the motor 22.

The system may have a sun sensor. A sun sensor error signal is generated in logic block 122 and multiplied by a weighting factor 1-W in logic block 124. The command angle is multiplied by weighting factor W in block 126. The resulting sun error signal is added to the angle error signal by adder 128. The motor 22 can move the reflective surfaces 12 in both a clockwise and counterclockwise direction to improve the accuracy of the system.

During gimbal calculation, both gimbal position, gimbal rate, and gimbal acceleration terms are calculated and summed. A continuous gimbal command is provided to the motor controller without calculating the empheris, gimbal, and alignment correction terms each interval. The gimbal position, gimbal rate and gimbal position acceleration terms are calculated such that the sum of the square of the position error at three time points in the future is minimized. The sum of the position error for three equal time points (0, PT, 2PT) is:

$$DS = (S(1)-SP)^2 + (S(2)-SP-SR*PT-SA*PT^2)^2 + (S(3)-SP-SR*2*PT-SA*4*PT^2)^2$$

where
$S(i)$ = Actual position at time 0, PT, and 2PT (i=1,2,3).
SP = Commanded position.
SR = Commanded position rate.
SA = Commanded position acceleration term times 2 (note the 2 is included as part of this term to reduce computation).
DS = Sum of the squares of the position error.

By taking the partial derivative of this equation with respect to SP, SR, and SA and setting them equal to zero, the resulting equations can be solved for SP, SR, and SA. The results are:

$$SP = S(1)$$

$$SR = \frac{4*S(2) - 3*S(1) - S(3)}{PT}$$

-continued $$SA = \frac{2*(S(1) - 2*S(2) + S(3))}{PT^2}$$

The position command (Pc) consists of three components. These components are the position (SP), gimbal angular rate (SR), and gimbal angular acceleration (SA). The position command (Pc) is:

$$Pc=SP+SR*DT+SA*DT^2$$

where DT is the time since the command was received. SA is actually the acceleration divided by 2.

Figure 7:
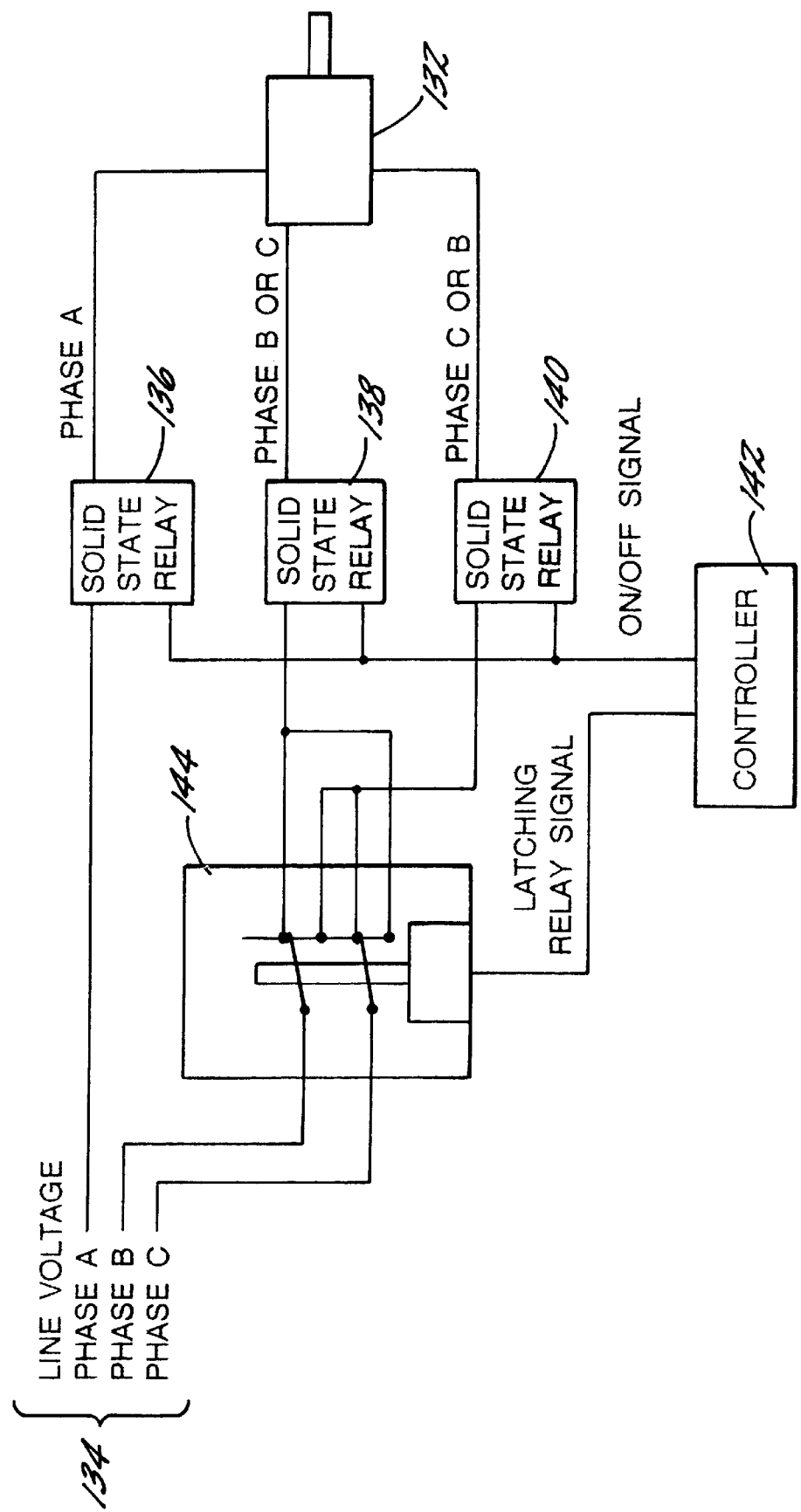
FIG. 7 is a schematic of a motor controller for a variable speed electric motor.

FIG. 7 shows a controller circuit 130 that controls an ac electric motor 132. The motor 132 is connected to power lines 134 of a three phase ac power source by solid state relays 136–140. The application of power to the motor 132 through the relays is controlled by controller 142. Two of the phases are connected to the solid state relays by latching relay 144. The direction of the motor 132 can be reversed by latching the relay 144 and switching the terminals of the two phases.

In operation, to reverse the direction of the motor 132, the controller 142 initially turns off the motor 132 through the relays 136–140. The controller 142 then latches the relay 144 to switch the B and C phases of power. After a predetermined time interval, to allow the contacts of the relay to settle, the controller 142 switches the relays 136–140 to apply power to the motor 132.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A solar energy conversion system that tracks a movement of a source of solar energy, comprising:
   a fixed target unit that converts solar energy into electrical energy;
   a pedestal;
   a reflective surface that reflects solar energy onto said fixed target unit, said reflective surface being supported by said pedestal;
   a pneumatic motor that rotates said reflective surface motor being supported by said pedestal and being in operative connection with said reflective surface;
   an electrically powered dedicated controller that controls said pneumatic motor to track the movement of the solar source and reflect solar energy onto said fixed target unit, said dedicated controller being supported by said pedestal; and
   a dedicated solar conversion device that converts solar energy into electrical energy, said dedicated solar conversion device being supported by said pedestal,
   said solar conversion device being in operative connection with said dedicated controller for supplying the electrical energy to said dedicated controller so that said dedicated controller controls said pneumatic motor and maintains said reflective surface in tracking engagement with the solar source and in reflective engagement with the fixed target unit.

2. The system as recited in claim 1, further comprising a compressor that is connected to a reservoir of air, said reservoir being connected to said pneumatic motor, said compressor being powered by the electrical energy provided by said solar conversion device.

3. The system as recited in claim 1, further comprising a first encoder coupled to an output shaft of said pneumatic motor, said first encoder generates a first position signal for each revolution of said output shaft, and a second encoder that is coupled to a gear that is coupled to said output shaft and said reflective surface, wherein said second encoder generates a second position signal for each revolution of said gear, said second position signal having a lower frequency than a frequency of said first position signal, said controller determines a position of said reflective surface from said first position signal and a reference point of said reflective surface from said second position signal.

4. The system as recited in claim 3, wherein said first encoder includes an encoder element mounted to a collar that is attached to said output shaft of said pneumatic motor and a pair of sensors located between said collar and said pneumatic motor.

5. The system as recited in claim 1, further comprising an oiler that adds oil to air that is provided to said pneumatic motor and a filter that removes the oil before the air is vented from said pneumatic motor to an atmosphere.

6. The system as recited in claim 1, further comprising a receiver that receives input commands to move said reflective surface.

7. A solar energy concentrator system that concentrates energy from a solar source and generates heat energy, said system comprising:
   a fixed target unit that collects solar energy, said fixed target unit including a working fluid which is heated by the solar energy; and
   a plurality of self-contained solar trackers spaced in an array around said fixed target unit, each of said self-contained solar trackers comprising;
   a pedestal;
   a reflective surface that reflects solar energy onto said fixed target unit, said reflective surface being supported by said pedestal,
   a pneumatic motor that rotates said reflective surface, said pneumatic motor being supported by said pedestal,
   an electrically powered dedicated controller that controls said pneumatic motor to track the movement of the solar source and reflect solar energy onto said fixed target unit, said dedicated controller being supported by said pedestal, and
   a dedicated solar conversion device that converts solar energy into electrical energy, said dedicated solar conversion device being supported by said pedestal,
   said dedicated solar conversion device being in operative connection with said dedicated controller for supplying the electrical energy to said dedicated controller so that said dedicated controller controls said pneumatic motor and maintains said reflective surface in tracking engagement with the solar source and in reflective engagement with said fixed target unit.

8. The concentrator system as recited in claim 7, further comprising a compressor that is connected to a reservoir of air, said reservoir being connected to said pneumatic motor, said compressor being powered by the electrical energy provided by said solar conversion device.

9. The concentrator system as recited in claim 7, further comprising a first encoder coupled to an output shaft of said pneumatic motor, said first encoder generates a first position signal for each revolution of said output shaft, and a second encoder that is coupled to a gear that is coupled to said output shaft and said reflective surface, wherein said second encoder generates a second position signal for each revolution of said gear, said second position signal having a lower frequency than a frequency of said first position signal, said controller determines a position of said reflective surface from said first position signal and a reference point of said reflective surface from said second position signal.

10. The concentrator system as recited in claim 9, wherein said first encoder includes an encoder element mounted to a collar that is attached to said output shaft of said pneumatic motor and a pair of sensors located between said collar and said pneumatic motor.

11. The concentrator system as recited in claim 7, further comprising an oiler that adds oil to air that is provided to said pneumatic motor and a filter that removes the oil before the air is vented from said pneumatic motor to an atmosphere.

12. The concentrator system as recited in claim 7, further comprising a receiver that receives input commands to move said reflective surface.

* * * * *

UNITED STATES PATENT AND TRADEMARK OFFICE
CERTIFICATE OF CORRECTION

PATENT NO. : 5,929,530

DATED : July 27, 1999

INVENTOR(S) : Stone

It is certified that error appears in the above-identified patent and that said Letters Patent is hereby corrected as shown below:

Column 5, line 48, after "surface" insert --, said pneumatic--.

Signed and Sealed this

First Day of February, 2000

Attest:

Q. TODD DICKINSON

Attesting Officer

Acting Commissioner of Patents and Trademarks